United States Patent [19]
Kato et al.

[11] Patent Number: 5,502,424
[45] Date of Patent: Mar. 26, 1996

[54] METHOD OF MAGNETIZING ROTARY MACHINE FIELD CORE UNIT

[75] Inventors: Yoshihiro Kato, Kariya; Toshiaki Hotta, Chiryu; Masaki Shimizu, Nagoya, all of Japan

[73] Assignee: Nippondenso Co., Ltd., Kariya, Japan

[21] Appl. No.: 399,886

[22] Filed: Mar. 7, 1995

[51] Int. Cl.⁶ .................................................. H01F 13/00
[52] U.S. Cl. .................................................. 335/284
[58] Field of Search ........................ 335/284; 310/42–45, 310/152–156

[56]  References Cited

FOREIGN PATENT DOCUMENTS

| | | |
|---|---|---|
| 54-116610 | 9/1979 | Japan . |
| 57-142165 | 9/1982 | Japan . |
| 61-85045 | 4/1986 | Japan . |
| 1129743 | 5/1989 | Japan . |

*Primary Examiner*—Leo P. Picard
*Assistant Examiner*—Raymond M. Barrera
*Attorney, Agent, or Firm*—Cushman, Darby & Cushman

[57]  ABSTRACT

An alternating current generator for vehicle has a permanent magnet in the rotary field core unit. Providing such magnet is effective to reduce leakage magnetic flux and the size of the machine. In order to magnetize the magnet without trouble caused by machined chips or iron powder, the magnet is magnetized after the rotary field core has been machined. While the magnet is magnetized in a short period by a pulse current, the field coil is short-circuited. The field coil is subjected to magnetizing flux passing therethrough and generates short-circuit current and, consequently, counter magnetomotive force, which prevents leakage of the magnetizing flux.

13 Claims, 5 Drawing Sheets

METHOD OF MAGNETIZING ROTARY MACHINE FIELD CORE UNIT

BACKGROUND OF THE INVENTION

1. Field of the Invention

The present invention is related to a rotary machine for a vehicle having a magnetic field pole core to which claw poles, a field coil and a permanent magnet are secured.

2. Description of the Related Art

In order to reduce leakage of magnetic flux from the magnetic field pole cores, a rotor of an alternating current generator having claw poles and magnetized permanent magnets disposed between the claw poles is disclosed in Japanese Patent Application Laid Open No. Sho 61-85045 filed by the applicant. The permanent magnets are magnetized before they are secured to the pole cores in the same direction as the claw poles are magnetized by the field coil. Thereafter, claw poles are lathed or machined to have an appropriate air gap and/or rotational balance of the rotor. For the same purpose, Japanese Patent Application Laid Open Sho 54-116610 discloses another alternating current generator having a rotor on which claw poles, a field coil and unmagnetized magnets are secured. The magnets are magnetized after the rotor and the stator have been assembled by supplying magnetizing current to the field coil of the generator.

However, when the rotor of the former generator is machined or lathed, chips or iron powder adhere to or are attracted to the rotor since the rotor is magnetized by the permanent magnets disposed therein, thereby causing various problems, such as rotor halting and its resultant engine stall. While the latter generator may solve the above problems, magnetizing force is limited by the field coil and is not enough to reduce the leakage of the magnetic flux from the pole cores.

SUMMARY OF THE INVENTION

The primary object of the present invention is to provide a problem free and efficient rotary machine having claw poles.

Another object of the present invention is to provide a method of magnetizing a magnet disposed in a field core of a rotary machine after the rotor is machined sufficiently, thereby reducing the magnetic flux leakage in the rotary machine.

A further object of the present invention is to provide a method of magnetizing a magnet disposed in a field core using a magnetizing coil having a comparatively smaller magnetizing power.

A still further object of the present invention is to provide a method of magnetizing a magnet while reducing leakage of magnetizing flux.

BRIEF DESCRIPTION OF THE DRAWINGS

Other objects, features and characteristics of the present invention as well as the functions of related parts of the present invention will become clear from a study of the following detailed description, the appended claims and drawings. In the drawings:

DETAILED DESCRIPTION OF THE PREFERRED EMBODIMENT

Figure 1:
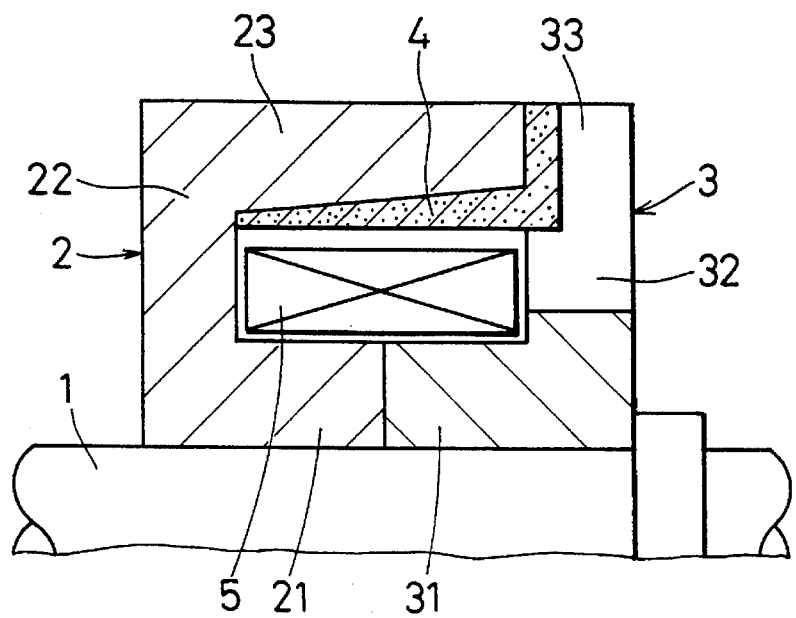
FIG. 1 is a cross-sectional side view illustrating a part of a rotor according to an embodiment of the present invention.
Figure 2:
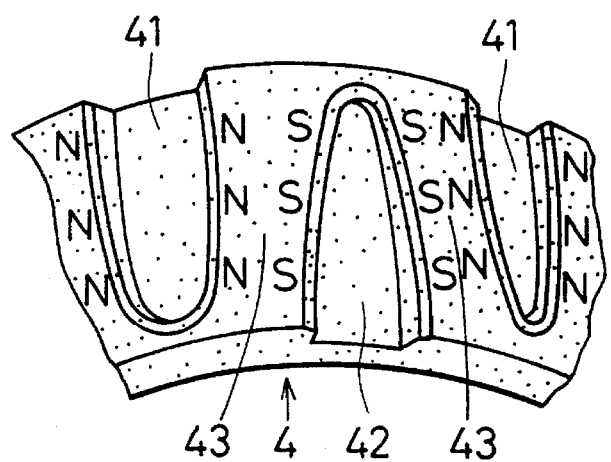
FIG. 2 is a perspective view illustrating a part of a magnet to which the embodiment of the present invention is applicable.
Figure 3:
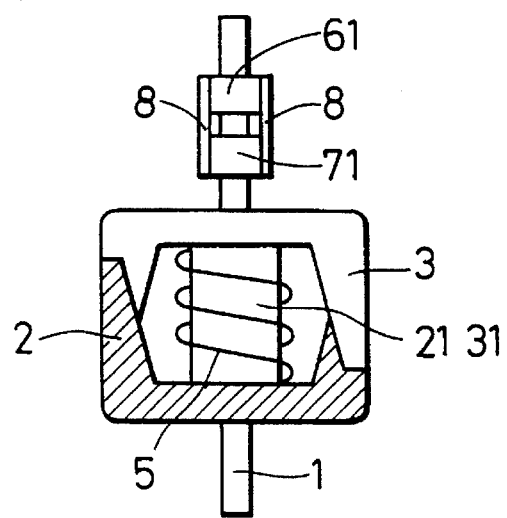
FIG. 3 is a schematic view of a rotor to which the embodiment of the present invention is applicable.

In FIG. 1, a rotor of an electric rotary machine such as an alternator or a generator for a vehicle has a rotary shaft 1 driven by an engine (not shown), a pair of first and second pole cores 2 and 3, which are made of low carbon solid iron, carried on the rotary shaft 1, a cylindrical magnet 4 disposed between the pair of pole cores 2 and 3 and a field coil 5 disposed inside the pair of pole cores 2 and 3 under the magnet 4. The pole cores 2 and 3 have cylindrical boss portions 21 and 31 secured to the rotary shaft 1, disc portions 22 and 32 radially extending from the boss portions 21 and 32, and axially extending first and second claw poles 23 and 33, respectively. Each core has six claw poles in this embodiment. The disc portions 22 and 32 have respectively six leg portions (not shown) radially extending to connect the base portions of the claw poles 23 and 33. The cylindrical magnet 4 is made of ferromagnetic-ferrite-powder-mixed resinous mixture which has coercive force sufficient to keep its magnetic flux against the magnetomotive force generated during ordinary operation of the generator. The cylindrical magnet 4 has six U-shaped cavities 41 and 42 having their open ends formed at its opposite ends on its outer periphery and bridging portions 43 between the cavities 41 and 42 as shown in FIG. 2. The magnet 4 is inserted between the claw poles 23 and 33 so that the U-shaped cavities 41 and 42 receive the corresponding claw poles 23 and 33, and the magnet 4 is bonded to the side and inner surfaces of the claw poles 23 and 33 by an adhesive agent (not shown). The field coil 5 of this embodiment has, for example, 380 turn windings. Finally, a pair of slip rings 61 and 71 are press-fitted to the rotary shaft 1 as schematically shown in FIG. 3 and ends of the field coil 5 are soldered to the slip rings in a well-known manner (not shown).

When the rotor is assembled, it is machined to have rotational balance, and lathed to get an appropriate air gap between the rotor and a stator yoke (not shown).

Thereafter, the bridging portions 43 of the magnet 4 are magnetized so that portions surrounding the cavities 41 become N poles and the other portions surrounding the cavities 42 become S poles as shown in FIG. 2.

In operation after the rotor and stator are assembled into a generator, the field coil 5 is energized so that the first claw poles 23 in the cavities 41 become N poles and the second claw poles 33 in the cavities 42 become S poles. Since the bridging portions 43 are magnetized as shown in FIG. 2, the magnetic flux generated by the bridging portions 43 is opposite the leakage flux generated by the claw poles 23 and 33 and, therefore, the leakage flux is significantly reduced, thereby increasing the amount of flux passing through armature windings of a stator (not shown).

Figure 4:
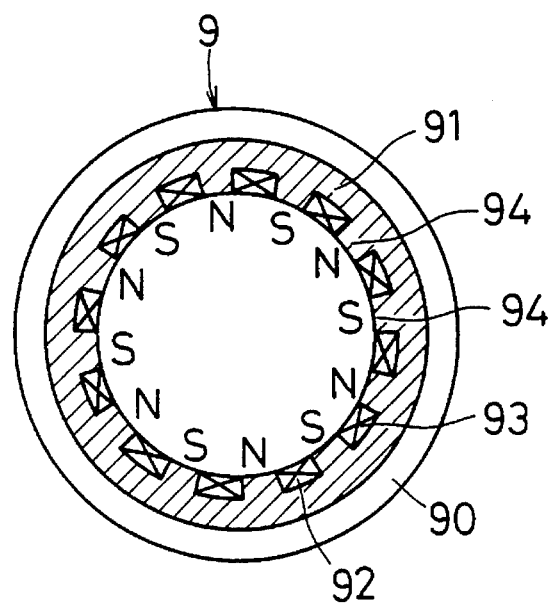
FIG. 4 is a cross-sectional plan view of a stator to which the embodiment of the present invention is applicable.
Figure 5:
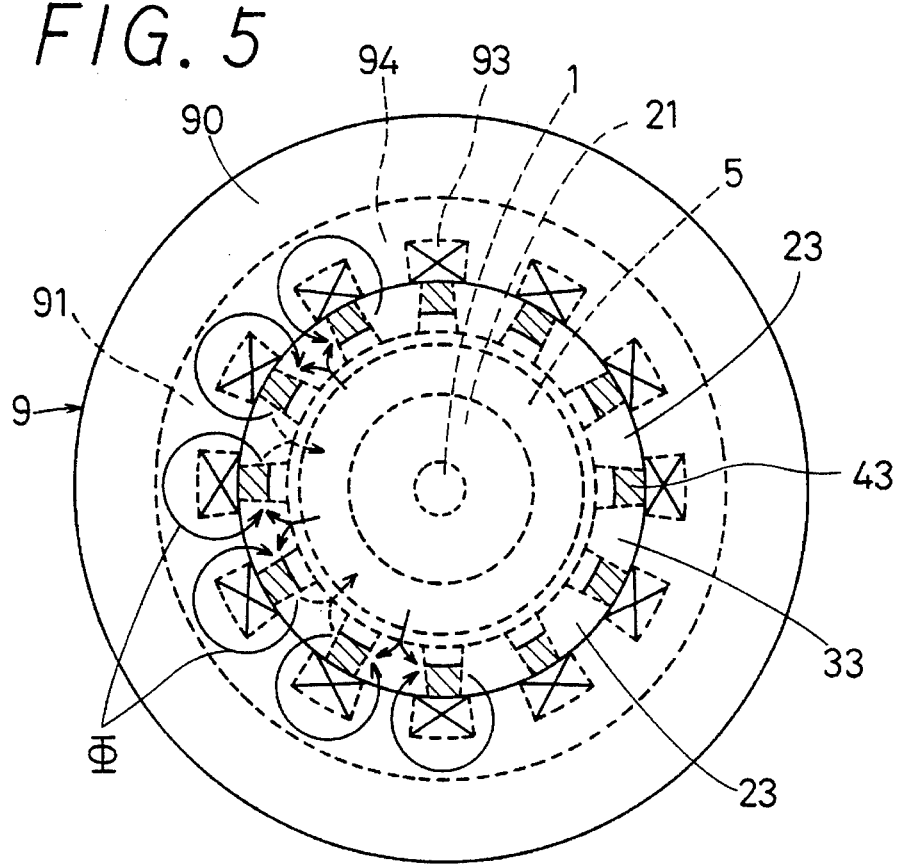
FIG. 5 is a schematic view illustrating magnetic flux generated in a stator core and a rotor in a magnetizing step according to the embodiment of the present invention.

Next will be explained a method of magnetizing the magnet assembled in the rotor according to the first embodiment of the present invention with reference to FIG. 4.

When the magnet is being magnetized, the slip rings 61 and 71 are bridged by a chuck 8 made of copper or other conductive material to short-circuit the field coil 5. This step is carried by a robot or other handling machine (not shown), manually or automatically.

Then the rotor is inserted into a magnetizing unit 9. The magnetizing unit 9 is comprised of a cylindrical cover 90 made of resinous material, a yoke 91 made of low carbon iron which has a plurality of slots 92 and is disposed inside the cover 90, and magnetizing coils 93 each having four-turn windings received in each of the slots 92. The slots are formed to surround magnetizing poles 94 which correspond to the respective claw poles 23 and 33 of the rotor. The rotor is positioned so that the first and second claw poles 23 and 33 may rightly face the respective magnetizing poles as shown in FIG. 4.

Then the magnetizing unit is energized by one pulse current discharged from a condenser of, for example, 3000 µF at 800 volts.

Consequently, a part of magnetic flux $\Phi r$ generated by the windings passes through the yoke 91, the first claw poles 23, the disk portion 22, the boss portions 21 and 31, the disk portion 32, and the second claw poles 33, and returns to the yoke 91. However, since the field coil 5 is wound around the boss portions 21 and 31 and is short-circuited, an electric current is induced by the magnetic flux $\Phi r$, thereby generating a counter magnetomotive force.

Figure 6:
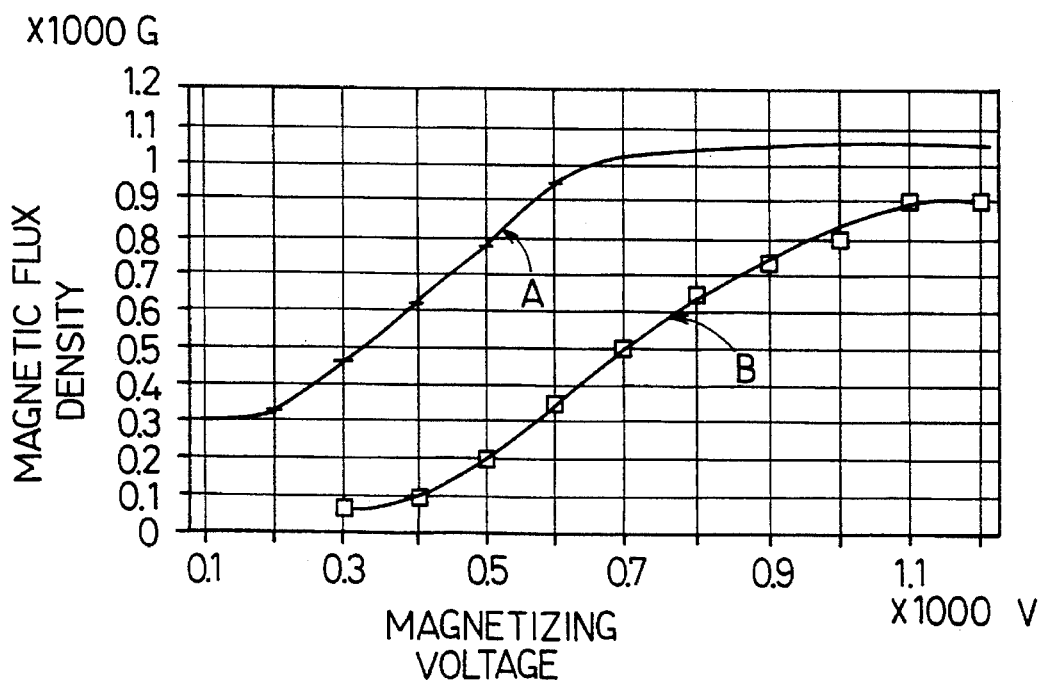
FIG. 6 is a graph showing magnetizing characteristics of the magnet according to the embodiment of the present invention.

As a result, the leakage magnetic flux $\Phi r$ is reduced significantly and the effective flux for magnetizing the magnet 4 is increased so that the bridging portions 43 of the magnet 4 are sufficiently magnetized in the circumferential direction as indicated by curve A shown in FIG. 6.

It is noted that the magnet 4 may not be magnetized by the same magnetizing unit if the field coil is not short-circuited even if the condenser charging voltage is raised to 1200 volts as indicated by a curve B shown in FIG. 6.

The short-circuit current may be controlled by connecting a resistor (not shown) in series with the field coil 5.

The leakage flux $\Phi r$ may be further reduced by supplying the field coil 5 to generate the counter magnetomotive force when the magnet is magnetized. The condenser for energizing the magnetizing unit may be replaced by a direct current source (not shown).

In case the pole cores of low carbon solid iron having high electric conductivity are used, the short circuitting step is omitted by supplying an appropriate discharging pulsed current.

The present invention may be applied to variants of the magnet 4 which is disposed in a rotor.

Figure 7:
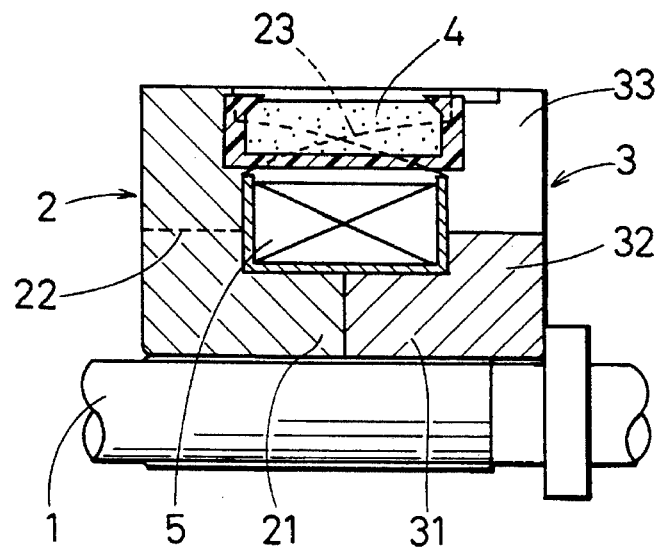
FIG. 7 is a cross-sectional side view illustrating a part of a variation of a rotor to which the present invention is applied.
Figure 8:
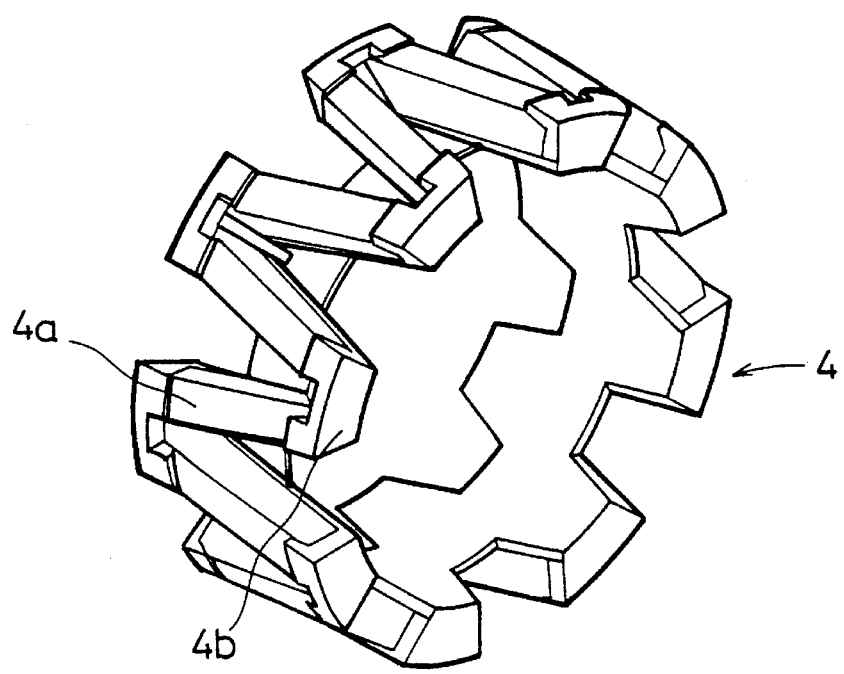
FIG. 8 is a perspective view illustrating magnet retainers and magnets of the rotor illustrated in FIG. 7.

One of the variants is shown in FIGS. 7 and 8, in which a magnet unit 4 has a plurality of ferrite magnet pieces which are mechanically held by retainers 4b.

Figure 9:
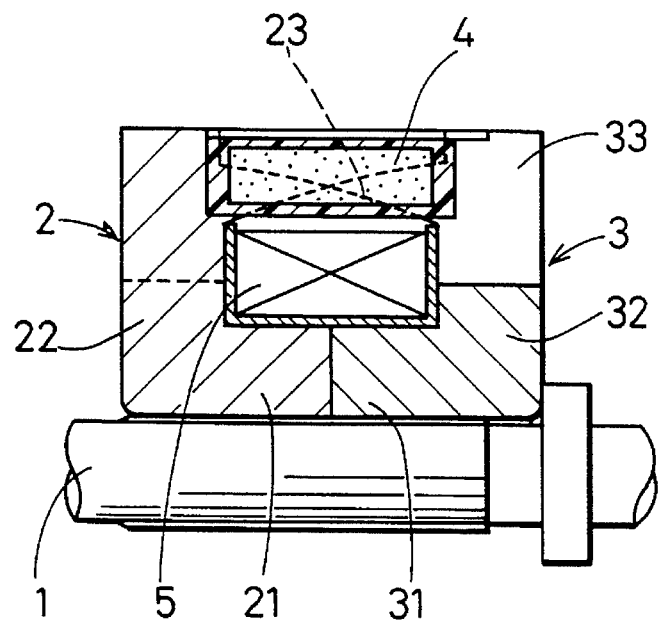
FIG. 9 is a cross-sectional side view illustrating a part of another variation of a rotor to which the present invention is applied.
Figure 10:
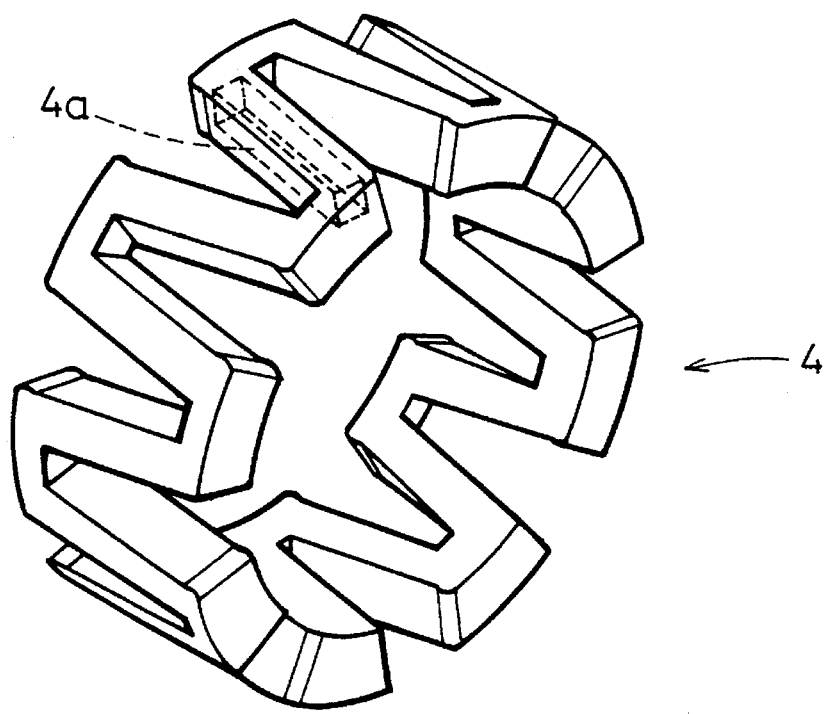
FIG. 10 is a perspective view illustrating a magnet mold of the rotor illustrated in FIG. 9.

Another variant is illustrated in FIGS. 9 and 10, in which ferrite magnets 4a are molded in a resinous mold structure 4.

The same reference numerals in the above figures are put on the portions corresponding to similar portions illustrated and described in the previous figures, and therefore, the description of such portions is omitted.

Finally, in the foregoing description of the present invention, the invention has been described with reference to specific embodiments thereof. It will, however, be evident that various modifications and changes may be made to the specific embodiments of the present invention without departing from the broader spirit and scope of the invention as set forth in the appended claims. Accordingly, the description of the present invention in this embodiment is to be regarded in an illustrative, rather than restrictive, sense.

What is claimed is:

1. A method of magnetizing a rotary machine field core unit having a cylindrical boss portion, a pair of disk members disposed at opposite sides of said field core unit, a plurality of first claw poles extending axially from one of said disk members toward the other disk member, a plurality of second claw poles extending axially from said the other disk member toward said one of disk members, at least one unmagnetized magnet member disposed between said first and second claw poles and a field coil wound around said cylindrical boss portion comprising the steps of:

short-circuiting said field coil; and supplying said field core unit with magnetizing flux in such a period that sufficiently enough short-circuit current may be generated to prevent a part of said magnetizing flux from passing through said boss portion.

2. The method of claim 1, wherein said short-circuiting step comprises connecting a current limiter in series with said field coil to control the short-circuit current generated during said supplying step.

3. The method of claim 1, wherein said supplying step comprises the steps of:

inserting said field core unit into a yoke member having a magnetizing coil and magnetizing poles corresponding to said claw poles so that each of said claw poles faces corresponding one of said magnetizing poles, and energizing said magnetizing coil with a pulse electric current to generate said magnetizing flux.

4. A method of magnetizing a rotary machine field core unit having a cylindrical boss portion, a pair of disk members disposed at opposite sides of said field core unit, a plurality of first claw poles extending axially from one of said disk members toward the other disk member, a plurality of second claw poles extending axially from said the other disk member toward said one of disk members, at least one unmagnetized magnet member disposed between said first and second claw poles and a field coil wound around said cylindrical boss portion comprising the steps of:

energizing said field coil to generate counter magnetomotive force to prevent magnetizing flux from passing through said field coil; and applying magnetomotive force across said first and second claw poles.

5. A method of magnetizing a rotary machine field core unit having a cylindrical boss portion, a pair of disk members disposed at opposite sides of said field core unit, a pair of claw poles extending axially from a corresponding one of said pair of disk members, an unmagnetized magnet member disposed between said pair of claw poles, a field coil wound around said cylindrical boss portion and a pair of slip rings electrically connected to coil ends of said field coil comprising the steps of:

bridging said pair of slip rings by a conductive chuck member to short-circuit said field coil; and applying magnetomotive force across said first and second claw poles in such a period for said field coil to generate short-circuit current sufficiently enough to prevent a part of said magnetizing flux from passing through said field coil.

6. The method of claim 5, wherein said applying step comprises the steps of:

inserting said field core unit into a yoke member having a magnetizing coil and magnetizing poles corresponding to said claw poles so that each of said claw poles faces corresponding one of said magnetizing poles; and energizing said magnetizing coil with one pulse electric current to generate said magnetomotive force.

7. A method of magnetizing a rotary machine field core unit having a cylindrical boss portion, a pair of disk members disposed at opposite sides of said field core unit, a pair of claw poles extending axially from a corresponding one of said pair of disk members, an unmagnetized magnet member disposed between said pair of claw poles, a field coil wound around said cylindrical boss portion and a pair of slip rings electrically connected to coil ends of said field coil comprising the steps of:

supplying said pair of slip rings with direct current to generate magnetomotive force in said field coil and prevent magnetizing flux from passing through said boss portion; and applying magnetomotive force across said first and second claw poles.

8. The method of claim 7, wherein said applying step comprises the steps of;

inserting said field core unit into a yoke member having a magnetizing coil and magnetizing poles corresponding to said claw poles so that each of said claw poles faces corresponding one of said magnetizing poles; and energizing said magnetizing coil with a pulse of electric current to generate said magneto-motive force.

9. The method of claim 8, wherein said energizing step comprises the step of:

charging a condenser with electrical energy; and discharging energy stored in said condenser into said magnetizing coil.

10. The method of claim 8, wherein said energizing step comprises the step of:

connecting a direct current source to the magnetizing coil.

11. A method of magnetizing a rotary machine field core unit having a cylindrical boss portion made of low carbon solid iron, a pair of disk members disposed at opposite sides of said field core unit, a pair of claw poles extending axially from a corresponding one of said pair of disk members, an unmagnetized magnet member disposed between said pair of claw poles, a field coil wound around said cylindrical boss portion and a pair of slip rings electrically connected to coil ends of said field coil comprising the steps of:

inserting said field core into a yoke having magnetizing poles and magnetizing coils surrounding the magnetizing poles so that each said claw pole faces a corresponding one of said magnetizing pole; and supplying said magnetizing coils with magnetizing current so that a first of said pair of claw poles are polarized to be N poles and a second of said pair of claw poles are polarized to be S poles.

12. The method claim 11, wherein said supplying step comprises the step of:

charging a condenser with electrical energy; and discharging energy stored in said condenser into said magnetizing coil.

13. A method of claim 11, wherein said supplying step comprises the step of:

connecting a direct current source to the magnetizing coil.

* * * * *